United States Patent
Benhase et al.

(10) Patent No.: US 9,459,808 B2
(45) Date of Patent: Oct. 4, 2016

(54) AUTOMATICALLY PREVENTING LARGE BLOCK WRITES FROM STARVING SMALL BLOCK WRITES IN A STORAGE DEVICE

(71) Applicant: International Business Machines Corporation, Armonk, NY (US)

(72) Inventors: Michael T. Benhase, Tucson, AZ (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/993,315

(22) Filed: Jan. 12, 2016

(65) Prior Publication Data

US 2016/0124655 A1   May 5, 2016

Related U.S. Application Data

(63) Continuation of application No. 14/719,680, filed on May 22, 2015, now Pat. No. 9,250,860, which is a continuation of application No. 13/550,141, filed on Jul. 16, 2012, now Pat. No. 9,043,572.

(51) Int. Cl.
| | |
|---|---|
| *G06F 12/00* | (2006.01) |
| *G06F 3/06* | (2006.01) |
| *G06F 12/02* | (2006.01) |
| *G06F 13/00* | (2006.01) |
| *G06F 3/00* | (2006.01) |
| *G06F 5/14* | (2006.01) |
| *G06F 12/14* | (2006.01) |

(Continued)

(52) U.S. Cl.
CPC ............... *G06F 3/064* (2013.01); *G06F 3/00* (2013.01); *G06F 3/061* (2013.01); *G06F 3/0604* (2013.01); *G06F 3/067* (2013.01); *G06F 3/0611* (2013.01); *G06F 3/0656* (2013.01); *G06F 3/0688* (2013.01); *G06F 5/14* (2013.01); *G06F 12/023* (2013.01); *G06F 12/0893* (2013.01); *G06F 12/1425* (2013.01); *G06F 13/00* (2013.01); *G06F 13/385* (2013.01); *G06F 3/0608* (2013.01); *G06F 2212/1044* (2013.01); *G06F 2212/1052* (2013.01); *G06F 2212/2022* (2013.01); *G06F 2212/60* (2013.01); *G06F 2213/3802* (2013.01)

(58) Field of Classification Search
None
See application file for complete search history.

(56) References Cited

U.S. PATENT DOCUMENTS

| | | | |
|---|---|---|---|
| 7,814,276 B2 | 10/2010 | Lin et al. | |
| 7,865,664 B2 | 1/2011 | Mori et al. | |

(Continued)

OTHER PUBLICATIONS

U.S. Appl. No. 13/550,141.

(Continued)

*Primary Examiner* — Brian Peugh
(74) *Attorney, Agent, or Firm* — Stephen R. Tkacs; Stephen J. Walder, Jr.; Randall J. Bluestone

(57) ABSTRACT

A mechanism is provided in a storage device for performing a write operation. The mechanism configures a write buffer memory with a plurality of write buffer portions. Each write buffer portion is dedicated to a predetermined block size category within a plurality of block size categories. For each write operation from an initiator, the mechanism determines a block size category of the write operation. The mechanism performs each write operation by writing to a write buffer portion within the plurality of write buffer portions corresponding to the block size category of the write operation.

22 Claims, 7 Drawing Sheets

(51) Int. Cl.
*G06F 13/38* (2006.01)
*G06F 12/08* (2016.01)

(56) References Cited

U.S. PATENT DOCUMENTS

| | | |
|---|---|---|
| 7,941,595 B2 | 5/2011 | Bullen et al. |
| 8,566,560 B2 | 10/2013 | Sekhar |
| 2007/0143378 A1 | 6/2007 | Gorobets |
| 2009/0132770 A1 | 5/2009 | Lin et al. |
| 2009/0198945 A1 | 8/2009 | Sekhar |
| 2010/0161888 A1 | 6/2010 | Eggleston |
| 2010/0205369 A1 | 8/2010 | Chang et al. |
| 2010/0241788 A1 | 9/2010 | Yeh |
| 2011/0125946 A1 | 5/2011 | Demura et al. |

OTHER PUBLICATIONS

U.S. Appl. No. 14/719,680.
"RamSan-500", Brochure, Texas Memory Systems, an http://www.ramsan.com/files/download/587, retrieved Jul. 16, 2012, 2 pages.
Debnath, Biplob et al., "Large Block CLOCK (LB-CLOCK): A Write Caching Alogorithrn for Solid State Disks", IEEE Int'l Symposium on Modeling, Analysis & Simulation of Computer and Telecommunications Systems, 2009, 9 pages.
Hutsell Woody, "An In-depth Look at the RamSan-500 Cached Flash Solid State Disk", Texas Memory Systems, White Paper, Sep. 2007, 17 pages.
Lee, Junghee et al, "A Semi-Preemptive Garbage Collector for Solid State Drives", 2011 IEEE Int'l. Symposium on Performance Analysis of Systems and Software, Apr. 2011, 10 pages.
Yang, Ding P., "A Design of Buffer Scheme by Using Data Filter for Solid State Disk", Thesis, University of Cincinnati, Feb. 24, 2007, 65 pages.

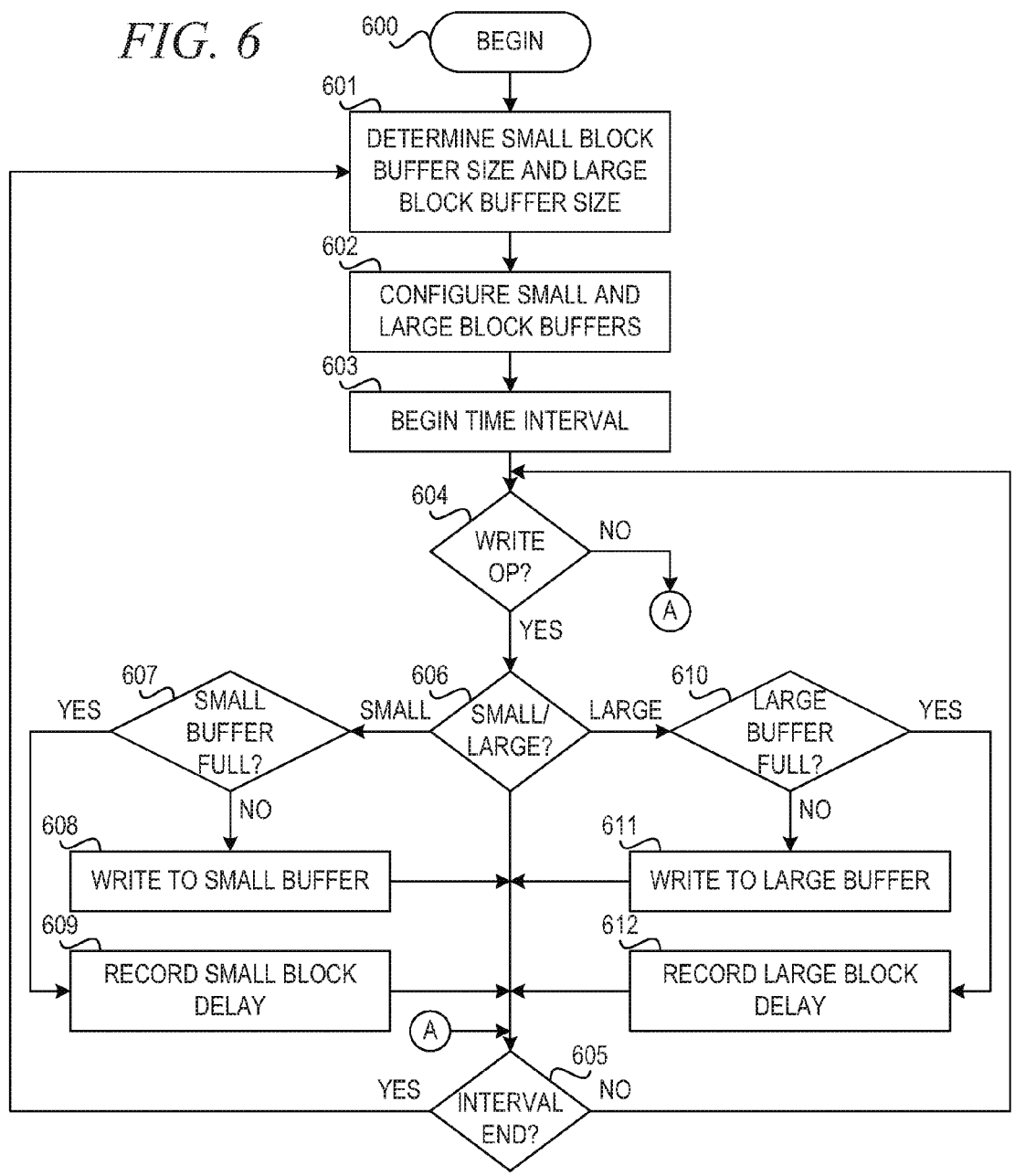

AUTOMATICALLY PREVENTING LARGE BLOCK WRITES FROM STARVING SMALL BLOCK WRITES IN A STORAGE DEVICE

BACKGROUND

The present application relates generally to an improved data processing apparatus and method and more specifically to mechanisms for automatically preventing large block writes from starving small block writes in a storage device, such as a solid-state drive or solid-state drive subsystem.

A solid-state drive (SSD) is a data storage device that uses solid-state memory like NAND Flash to store persistent data. Solid State Disks can refer to many different form factors including those that have similar protocol access of a traditional block I/O hard disk drive. The term SSD can also refer to form factors that are not common with hard disk drives (HDDs) like peripheral component interconnect express (PCIE) cards or custom form factors. SSDs are distinguished from traditional HDDs, which are electromechanical devices containing spinning disks and movable read/write heads. SSDs, in contrast, use microchips that retain data in non-volatile memory chips and contain no moving parts. Compared to electromechanical HDDs, SSDs are typically less susceptible to physical shock, are quieter, and have lower access time and latency. SSDs do come in forms that have the same interface as hard disk drives like serial attached small computer systems interface (SAS), serial advanced technology attachment (SATA), and Fibre Channel, thus allowing clients to use the two types interchangeably in most available storage systems today. In some applications, a client may use all SSDs, while in many applications the client might use a mixture of the two types.

SSDs are starting to revolutionize the data center as heretofore unheard of levels of performance are now possible. Servers can bring in more data, and the input/output (IO) bottleneck that caused faster and faster processors to wait more often is much less of a problem. Storage systems are also starting to use SSDs as tiers of storage alongside HDDs. In some cases, pure SSD configurations are starting to be used. Because SSDs hold vital client data, it is important that the drives still have some sort of disaster recovery solution applied to them like flash copy or peer-to-peer remote copy or both.

These operations can result in multiple concurrent streams of commands to the SSD. The user may be issuing a combination of read and write operations. In many online transaction processing (OLTP) environments, the data size of these operations are relatively small. Perhaps 4 K bytes and even smaller for mainframe systems. The snap shot and remote copy operation may result in very large block writes, say 128 K or 256 KB or even larger. This is one reason an SSD may see an intermix of both large and small block writes. Other applications will also result in the same effect but for different reasons.

As users start to adopt NAND Flash SSDs in more applications, some of the complexities of their usage are becoming apparent. While they perform much faster than HDDs, they can not simply be overwritten as an HDD can, therefore, data must be virtualized and a map table created to store physical to logical map information. Update writes cause invalidates to parts of the map table and therefore garbage collection must take place in order to reclaim space that is not being used. This garbage collection process must be performed concurrently with host operations and care must be taken so that it will not cause inconsistent performance.

Additionally, the nature of writes poses issues for SSDs in many other ways. A write operation to NAND Flash must take place at a certain minimum granularity referred to hereafter as a page. A page in current Flash devices is 8 K and seems to be headed to 16 K bytes. Before a write can take place, the erase block must first have been erased. An erase block contains many pages. It can be 512 K up to 2 MB and even larger. Erases take place in the back ground as blocks are reclaimed but they can take many milliseconds to successfully erase.

Although an SSD can perform many thousands of writes it does so by the use of parallelism. Each Flash die is very slow at performing a write and it can take up to 2 ms to write a page. Although modern Flash are designed to have 2 or 4 planes, it still means that a given Flash die can only write up to 4 pages concurrently. This means that some commands have to wait in queues before they can be completed.

These are a few specific issues that cause complexity with keeping Flash performance and latency consistent, and specifically with regards to writes. One can see that the writing of large blocks can keep more Flash die busy and therefore can cause small block writes to endure large waits.

SUMMARY

In one illustrative embodiment, a method, in a data processing system, is provided for performing a write operation. The method comprises configuring a write buffer memory with a plurality of write buffer portions. Each write buffer portion is dedicated to a predetermined block size category within a plurality of block size categories. The method further comprise for each write operation from an initiator, determining a block size category of the write operation. The method further comprises performing each write operation by writing to a write buffer portion within the plurality of write buffer portions corresponding to the block size category of the write operation.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 is a flowchart illustrating operation of a mechanism for preventing large block writes from starving small block writes in accordance with an illustrative embodiment;

DETAILED DESCRIPTION

Figure 1:
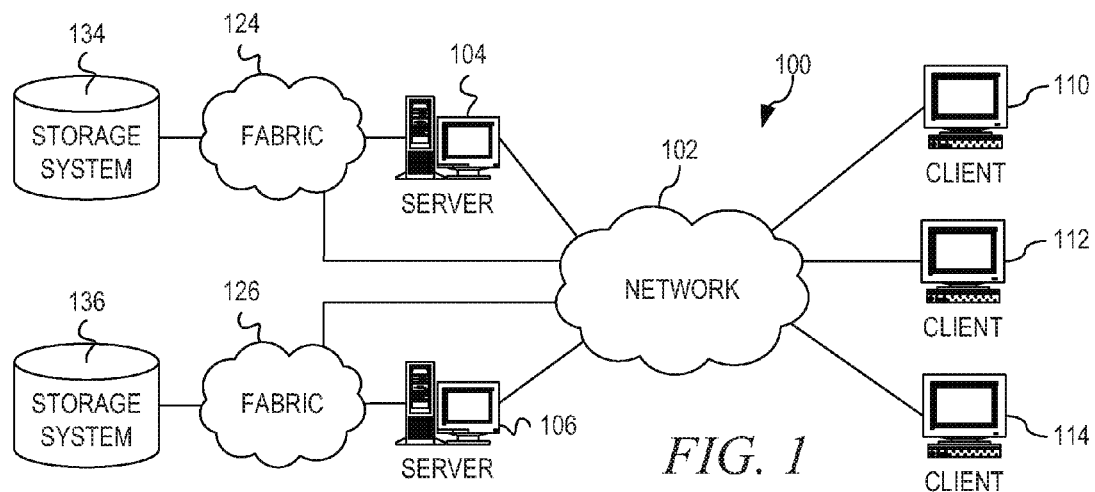
FIG. 1 depicts a pictorial representation of an example distributed data processing system in which aspects of the illustrative embodiments may be implemented.
Figure 2:
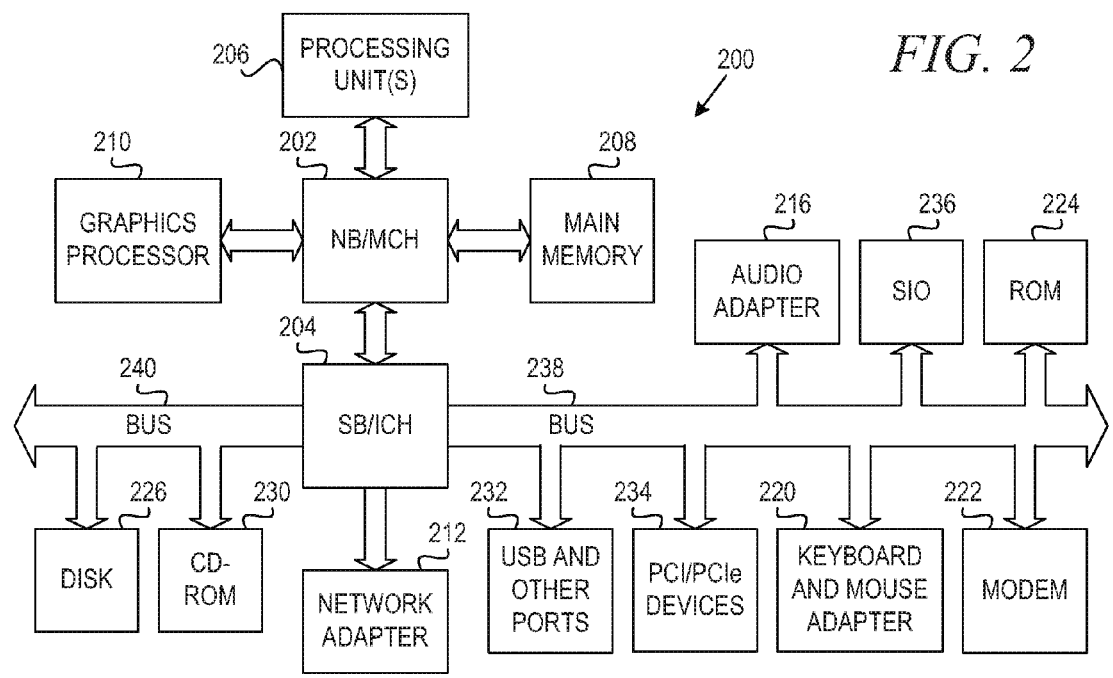
FIG. 2 is a block diagram of an example data processing system in which aspects of the illustrative embodiments may be implemented.
Figure 3:
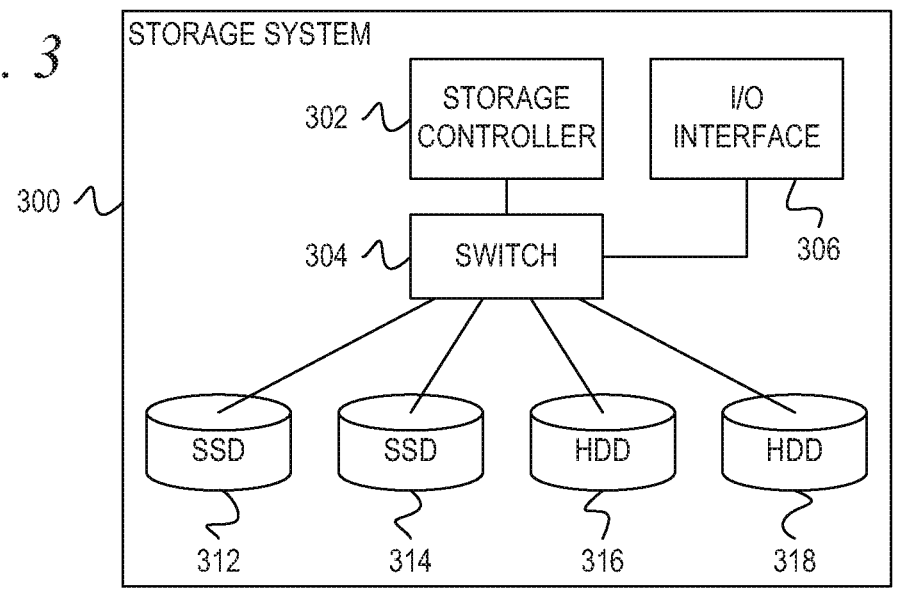
FIG. 3 is a block diagram depicting an example storage system in accordance with an illustrative embodiment.

The illustrative embodiments may be utilized in many different types of data processing environments including a distributed data processing environment, a single data processing device, or the like. In order to provide a context for the description of the specific elements and functionality of the illustrative embodiments, FIGS. 1-3 are provided hereafter as example environments in which aspects of the illustrative embodiments may be implemented. While the description following FIGS. 1-3 will focus primarily on a single data processing device implementation, this is only an example and is not intended to state or imply any limitation with regard to the features of the present invention.

With reference now to the figures and in particular with reference to FIGS. 1-3, example diagrams of data processing environments are provided in which illustrative embodiments of the present invention may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers, communication fabrics, and storage systems in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102. Server 104 is also connected to storage system 134 via fabric 124, and server 106 is connected to storage system 136 via fabric 126. In addition, clients 110, 112, and 114 are also connected to network 102. These clients 110, 112, and 114 may be, for example, personal computers, network computers, or the like. In the depicted example, server 104 may provide data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Fabrics 124, 126 may be any communications fabric that supports I/O traffic between a host and a storage system. For example, fabrics 124, 126 may be Fibre Channel, serial attached SCSI, Ethernet, or the like, and may include switches or routers to support I/O communication. Fabrics 124, 126 may also support connection to network 102. For example, server 106 may access storage system 134 via network 102 and fabric 124 without intervention of server 104. Similarly, server 104 may access storage system 136 without intervention of server 106.

In accordance with an illustrative embodiment, distributed data processing system 100 provides a dual remote copy configuration for disaster recovery. That is, when server 104 performs a write operation to storage system 134, the write operation is also performed at storage system 136. The dual remote copy may be performed by the host, such as server 104, or by the storage system itself, such as storage system 134. For example, server 104 may write data to storage system 134 and have the data copied to storage system 136 such that if storage system 134 were to fail, server 104 may then read the data from storage system 136.

Storage system 136 may be placed at a remote location from storage system 134, perhaps on a different continent. Thus, if there was a disaster, such as a tire or the like, and storage system 134 was destroyed, the data would be safe at storage system 136, and storage system 134 could be recreated using the data at storage system 136.

Storage systems 134, 136 may use solid-state drives (SSDs), either alone or alongside hard disk drives (HDDs) in a tiered storage configuration. In the case of peer-to-peer remote copy, SSDs may be used as a target for such an operation and large block writes will occur to the drives. SSDs are normally used to store small block IO operations (OPs). During a target copy operation, large block and small block writes may occur simultaneously. There are other reasons for large blocks to occur as well. During such periods, due to the nature of the SSDs, the large block writes can dominate the bandwidth available in the device and have the effect of starving the small block writes, thus increasing the response time. In many cases, transaction processing environments need guaranteed response time and such an increase can be disastrous.

In accordance with the illustrative embodiments, a mechanism is provided to allow both large block and small block writes optimal bandwidth and to automatically adjust depending on changes in the workload. Write buffers or caches in the storage device are broken into categories. Some of the buffers are dedicated to large block writes, some to small block writes, and some buffers serve both small and large block writes. This allotment prevents a rapid succession of large write commands from taking over the entire buffer and therefore locking out small block writes until the large block can complete. A small block transfer will complete relatively quickly and, therefore, the large block transfers will not suffer much added latency from what they would naturally cause. The mechanism may adjust the sizes of these buffers depending on changes in the workload. The mechanism may determine that small block or large block response time increases. The mechanism may dedicate a bandwidth percentage to small block writes to ensure small block writes are not starved. The size of small block vs. large block may be experimentally derived or may be adjusted dynamically as workload changes. It is also possible to have more than two block sizes and do very similar partitioning with additional categories.

With reference now to FIG. 2, a block diagram of an example data processing system is shown in which aspects of the illustrative embodiments may be implemented. Data processing system 200 is an example of a computer, such as client 110 or server 104 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System P® computer system, running the Advanced interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 30, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

FIG. 3 is a block diagram depicting an example storage system in accordance with an illustrative embodiment. Storage enclosure 300, which may be storage system 134 or storage system 136 in FIG. 1, for example, is comprised of storage controller 302, which may be a redundant array of independent disks (RAID) controller or a non-RAID controller. Storage controller 302 communicates storage devices 312, 314, 316, and 318 through switch 304. Switch 304 may be, for example, a serial attached SCSI (SAS) switch. Other devices in a storage area network (SAN) may write data to or read data from storage enclosure 300 by connection to switch 304 via I/O interface 306. Storage controller 302 may be a processor operating under control of instructions stored in a memory (not shown).

In the depicted example, storage devices 312, 314, 316, and 318 include solid-state drives (SSDs) 312, 314 and hard disk drives (HDDs) 316, 318. SSDs 312, 314 may be used alongside HDDs 316, 318 in a tiered storage configuration.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system, other than the SMP system mentioned previously, without departing from the spirit and scope of the present invention.

Figure 4:
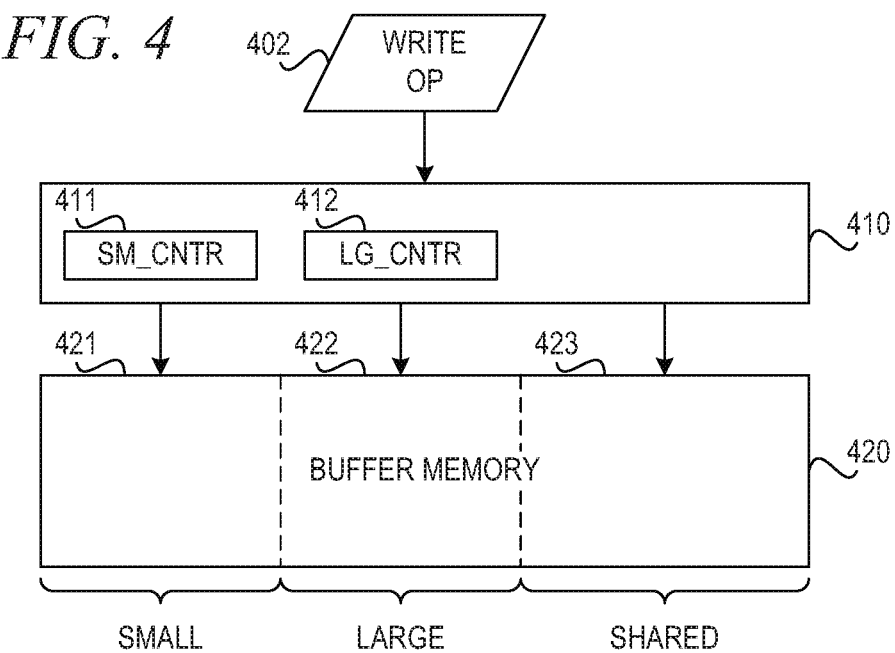
FIG. 4 is a block diagram illustrating a mechanism for preventing large block writes from starving small block writes in accordance with an illustrative embodiment.

FIG. 4 is a block diagram illustrating a mechanism for preventing large block writes from starving small block writes in accordance with an illustrative embodiment. Processor 410 is a storage controller for a solid-state drive (SSD) in accordance with the illustrative embodiment. Processor 410 receives a write operation 402. Processor 410 treats large block writes differently from small block writes by dynamically allocating cache or buffer size to different write block sizes. Because the object is to allow space into write buffers, processor 410 configures buffer memory 420 with three types of buffer space: small block buffer portion 421, large block buffer portion 422, and shared buffer portion 423. A large block write cannot write into small block buffer portion 421. A small block write cannot write into large block buffer portion 422. Both small and large block writes can write into shared buffer portion 423.

A mode page setting may allow programmability. For example, a mode page setting may set the large block threshold at 48 KB such that writes of blocks smaller than or equal to 48 KB are considered small block writes and writes of blocks greater than 48 KB are considered large block writes. In alternative embodiments processor 410 may consider more than two categories and configure buffer memory 420 accordingly.

In accordance with one example embodiment, a feedback mechanism may be provided such that counters keep track of large block and small block operations that have to wait before going into the buffer. Processor 410 may include a small write counter (SM_CNTR) 411 and large write counter (LG_CNTR) 41. Processor 410 may increment small write counter 411 responsive to a small write operation having to wait before being stored in buffer memory 420 and may increment large write counter 412 responsive to a large write operation having to wait before being stored in buffer memory 420. Processor 410 strives to keep this balanced by checking how much buffer space each category can use. Counters may keep track of both the number of commands and amount of data written to both small and large block buffer portions. Counters for small and large blocks that would keep track of total delay for each size category may also be included.

If processor 410 determines neither block size category is experiencing delay due to no buffer space available (i.e., SM_CNTR 411 and LG_CNTR 412 are below a predetermined threshold), then the sizes of small block buffer portion 421 and large block buffer portion 422 remain the same. If both block size categories are experiencing latency within specified limits, and both categories are experiencing about the same blocking delay (i.e., the difference between SM_CNTR 411 and LG_CNTR 412 is within a predetermined threshold), then the sizes of small block buffer portion 421 and large block buffer portion 422 remain the same, it should be noted that large blocks take longer to write so such differences would be included in the threshold calculation. If one block size is experiencing delay (i.e., only one of SM_CNTR 411 or LG_CNTR 412 is greater than a predetermined threshold), then processor 410 takes some space from the buffer portion not experiencing delay or the shared buffer portion 423 and gives that space to the buffer portion experiencing delay.

This feedback operation may be done in small increments and may be tested over a relatively large time interval. In other words, processor 410 may initialize counters 411, 412 by setting them to zero at the beginning of each time interval and test for delay at the end of each time interval. These adjustments may continue until stasis occurs.

In accordance with another example embodiment, a feedback mechanism may be provided such that counters 411, 412 keep track of the writes of the two transfer sizes. That is, processor 410 may increment small write counter 411 responsive to a small write operation and may increment large write counter 412 responsive to a large write operation. Processor 410 may periodically determine whether the rate of one block size or the other falls below a predetermined threshold Some workloads may have very few or no large block writes, for example. If this is the case, then processor 410 may determine large block write counter 412 falls below a predetermined threshold and convert large block buffer portion 422 into shared buffer memory. Alternatively, the rate of small write operations may fail below a predetermined threshold if the SSD is idle except for extended peer-to-peer remote copy operations. In this case, responsive to determining small block write counter 411 fails below a predetermined threshold, processor 410 converts small block buffer portion 421 into shared buffer memory. Processor 410 may continue to monitor the rates of small block writes and large block writes and switch back to dedicated small block or large block write buffer portions if it detects either blocking delays are skewed or counts for write operations increase to exceed the predetermined threshold.

Figure 5:
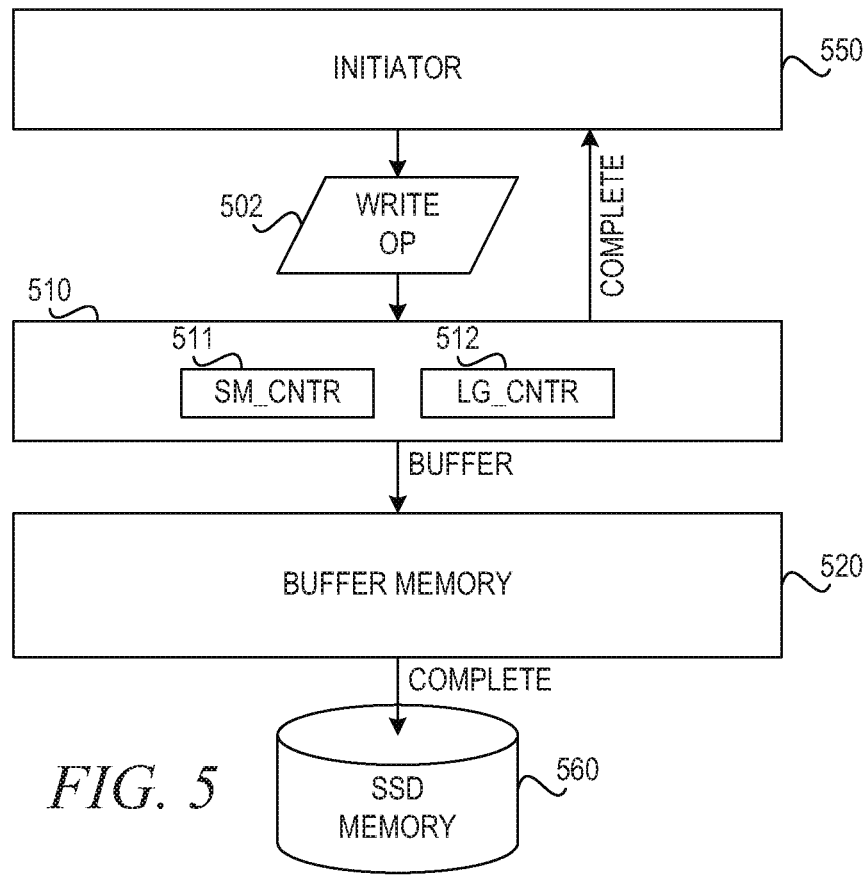
FIG. 5 is a block diagram illustrating a mechanism for keeping bandwidth equal between large block writes and small block writes in accordance with an illustrative embodiment.

FIG. 5 is a block diagram illustrating a mechanism for keeping bandwidth equal between large block writes and small block writes in accordance with an illustrative embodiment. Processor 510 is a storage controller for a solid-state drive (SSD) in accordance with the illustrative embodiment. Processor 510 receives a write operation 502 from initiator 550. Processor 510 performs the write operation by buffering the write in buffer memory 520 and completing the write to solid-state drive memory 560. When processor 510 completes a write operation, processor 510 sends a complete notification to initiator 550.

Processor 510 distinguishes between small block writes and large block writes but does not buffer them differently. Processor 510 keeps bandwidth equal between large and small block transfers or keeps X % for small block transfers and (100−X) % for large block transfers. The value of X may be set in a mode page or may be determined by counters 511, 512 measuring response time, as described above with reference to FIG. 4.

One way to do this is to assume or require the queue depth of large and small block operations be controlled by the initiator. The initiator will not send another large block operation until a previous large block operation has completed. The initiator may also send a small block write operation only when a previous small block write operation has completed. Thus, if the SSD completes only small block operations until X % of the bandwidth is consumed. The initiator will then only send additional small block write operations. Once X % of the bandwidth is consumed, the SSD completes large block operations so the initiator can send more large block write operations.

For example, consider small blocks are 4 KB, large blocks ace 400 KB, and X is 10%. Processor 510 completes eleven small block operations (44 KB) before completing one large block operation (400 KB). If X is 50%, the SSD completes one hundred small block operations (400 KB) per large block operation (400 KB).

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 6 is a flowchart illustrating operation of a mechanism for preventing large block writes from starving small block writes in accordance with an illustrative embodiment. Operation begins (block 600), and the mechanism determines small block buffer size and large block buffer size (block 601). In this embodiment, the mechanism attempts to balance the buffering of small block writes and large block writes by selecting appropriate sizes for the small block buffer size and the large block buffer size. The mechanism configures the small and large buffer portions (block 602) and begins a time interval (block 603).

The mechanism then determines whether a write operation is received from an initiator (block 604). If the mechanism does not receive a write operation, the mechanism determines whether the interval ends (block 605). If the interval does not end, operation returns to block 604 to determine whether a write operation is received.

If the mechanism receives a write operation in block 604, the mechanism determines whether the write operation is a small block write or a large block write (block 606). If the write operation is a small block write, the mechanism determines whether the small block write buffer is full (block 607). If the small block buffer is not full, the mechanism writes to the small buffer (block 608), and operation proceeds to block 605 to determine whether the interval ends. If the interval does not end, operation returns to block 604 to determine whether a write operation is received.

If the small block buffer is full in block 607, the mechanism records a small block delay (block 609). The mechanism may record the small block delay by incrementing a small block counter, for example. Thereafter, operation proceeds to block 605 to determine whether the interval ends, and if the interval does not end, operation returns to block 604 to determine whether a write operation is received.

If the write operation is a large block write in block 606, the mechanism determines whether the large block buffer is full (block 610). If the large block buffer is not fill, the mechanism writes to the large block buffer (block 611), and operation proceeds to block 605 to determine whether the interval ends. If the interval does not end, operation returns to block 604 to determine whether a write operation is received.

If the large block buffer is full in block 610, the mechanism records a large block delay (block 612). The mechanism may record the large block delay by incrementing a large block counter, for example. Thereafter, operation proceeds to block 605 to determine whether the interval ends, and if the interval does not end, operation returns to block 604 to determine whether a write operation is received.

If the interval ends in block 605, operation returns to block 601 to determine small block buffer size and large block buffer size. The mechanism may then adjust the small block buffer size and large block buffer size to reduce write operation delays. If the mechanism determines neither block size category is experiencing delay due to no buffer space available, then the sizes of small block buffer and large block buffer remain the same. If both block size categories are experiencing about the same blocking delay, then the sizes of small block buffer and large block buffer remain the same. If one block size is experiencing delay, then the mechanism takes some space from the buffer not experiencing delay and gives that space to the buffer experiencing delay.

This feedback operation may be done in small increments and may be tested over a relatively large time interval. In other words, the mechanism may initialize counters by setting them to zero at the beginning of each time interval and test for delay at the end of each time interval. These adjustments may continue until stasis occurs. In an alternative embodiment, the mechanism may also adjust the thresholds used to determine whether the buffer size categories are experiencing blocking delay.

Figure 7:
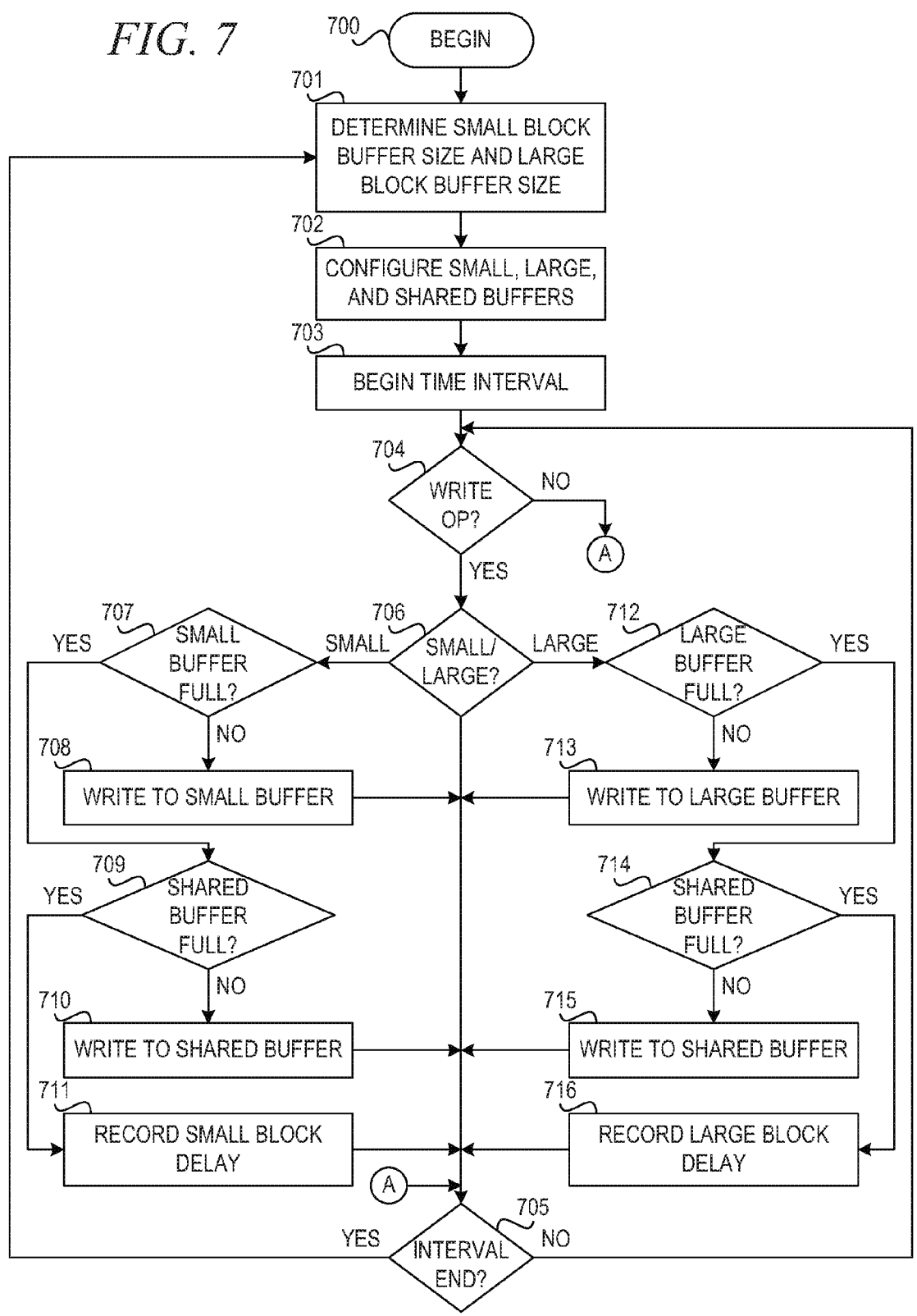
FIG. 7 is a flowchart illustrating operation of a mechanism for preventing large block writes from starving small block writes using small, large, and shared write buffers in accordance with an illustrative embodiment.

FIG. 7 is a flowchart illustrating operation of a mechanism for preventing large block writes from starving small block writes using small, large, and shared write buffers in accordance with an illustrative embodiment. Operation begins (block 700), and the mechanism determines small block buffer size and large block buffer size (block 701). In this embodiment, the mechanism attempts to balance the buffering of small block writes and large block writes by selecting appropriate sizes for the small block buffer size and the large block buffer size. The mechanism configures the small buffer portion, large buffer portion, and a shared buffer portion (block 702) and begins a time interval (block 703).

The mechanism then determines whether a write operation is received from an initiator (block 704). If the mechanism does not receive a write operation, the mechanism determines whether the interval ends (block 705). If the Interval does not end, operation returns to block 704 to determine whether a write operation is received.

If the mechanism receives a write operation in block 704, the mechanism determines whether the write operation is a small block write or a large block write (block 706). If the write operation is a small block write, the mechanism determines whether the small block write buffer is full (block 707). If the small block buffer is not full, the mechanism writes to the small buffer (block 708), and operation proceeds to block 705 to determine whether the interval ends. If the interval does not end, operation returns to block 704 to determine whether a write operation is received.

If the small block buffer is full in block 707, the mechanism determines whether the shared buffer is full (block 709). If the shared buffer is not full, the mechanism writes to the shared buffer (block 710), and operation proceeds to block 705 to determine whether the interval ends. If the shared buffer is full in block 709, the mechanism records a small block delay (block 711). The mechanism may record the small block delay by incrementing a small block counter, for example. Thereafter, operation proceeds to block 705 to determine whether the interval ends, and if the interval does not end, operation returns to block 704 to determine whether a write operation is received.

If the write operation is a large block write in block 706, the mechanism determines whether the large block buffer is full (block 712). If the large block buffer is not full, the mechanism writes to the large block buffer (block 713), and operation proceeds to block 705 to determine whether the interval ends. If the interval does not end, operation returns to block 704 to determine whether a write operation is received.

If the large block buffer is full in block 712, the mechanism determines whether the shared buffer is full (block 714). If the shared buffer is not full, the mechanism writes to the shared buffer (block 715), and operation proceeds to block 705 to determine whether the interval ends. If the shared buffer is full in block 714, the mechanism records a large block delay (block 716). The mechanism may record the large block delay by incrementing a large block counter, for example. Thereafter, operation proceeds to block 705 to determine whether the interval ends, and if the interval does not end, operation returns to block 704 to determine whether a write operation is received.

If the interval ends in block 705, operation returns to block 701 to determine small block buffer size and large block buffer size. The mechanism may then adjust the small block buffer size and large block buffer size to reduce write operation delays. If the mechanism determines neither block size category is experiencing delay due to no buffer space available, then the sizes of small block buffer and large block buffer remain the same. If both block size categories are experiencing about the same blocking delay, then the sizes of small block buffer and large block buffer remain the same. If one block size is experiencing delay, then the mechanism takes some space from the buffer not experiencing delay and gives that space to the buffer experiencing delay.

This feedback operation may be done in small increments and may be tested over a relatively large time interval. In other words, the mechanism may initialize counters by setting them to zero at the beginning of each time interval and test for delay at the end of each time interval. These adjustments may continue until stasis occurs. In an alternative embodiment, the mechanism may also adjust the thresholds used to determine whether the buffer size categories are experiencing blocking delay.

Figure 8:
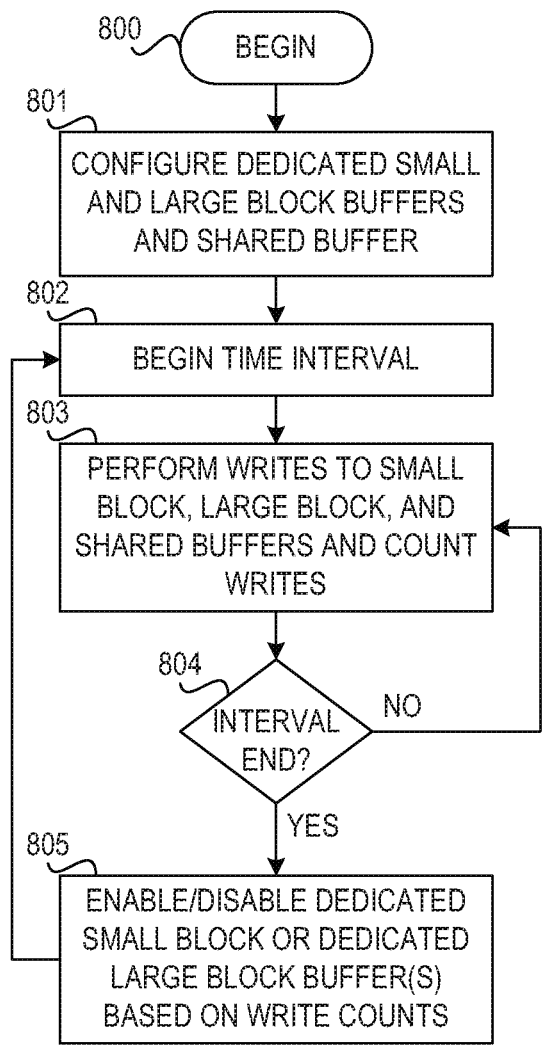
FIG. 8 is a flowchart illustrating operation of a mechanism for preventing large block writes from starving small block writes using dedicated small and large write buffers in accordance with an illustrative embodiment.

FIG. 8 is a flowchart illustrating operation of a mechanism for preventing large block writes from starving small block writes using dedicated small and large write buffers in accordance with an illustrative embodiment. Operation begins (block 800), and the mechanism configures dedicated small and large block buffers and a shared buffer (block

801). The mechanism then begins a time interval (block 802). The mechanism performs writes to small block, large block, and shared buffers and counts small block writes and large block writes (block 803).

The mechanism determines whether the time interval ends (block 804). If the time interval has not ended in block 804, operation returns to block 803 to continue to perform writes and count small and large block writes. If the mechanism determines that the time interval has ended in block 804, the mechanism enables or disables the dedicated small block write buffer or the dedicated large block write buffer based on the write counts (block 805). Thereafter, operation returns to block 802 to restart the time interval.

In this embodiment, the mechanism periodically determines whether the rate of one block size or the other falls below a predetermined threshold. Some workloads may have very few or no large block writes, for example. If this is the case, then the mechanism may determine a large block write counter falls below a predetermined threshold and convert the dedicated large block buffer into shared buffer memory. Alternatively, the rate of small write operations may fall below a predetermined threshold if the SSD is idle except for extended peer-to-peer remote copy operations. In this case, responsive to determining a small block write counter falls below a predetermined threshold, the mechanism may convert the dedicated small block buffer into shared buffer memory. The mechanism may continue to monitor the rates of small block writes and large block writes and switch back to dedicated small block or large block write buffer portions in block 805 if it detects either blocking delays are skewed or counts for write operations increase to exceed the predetermined threshold. In an alternative embodiment, the mechanism may also adjust the thresholds based on the workloads being experienced.

Figure 9:
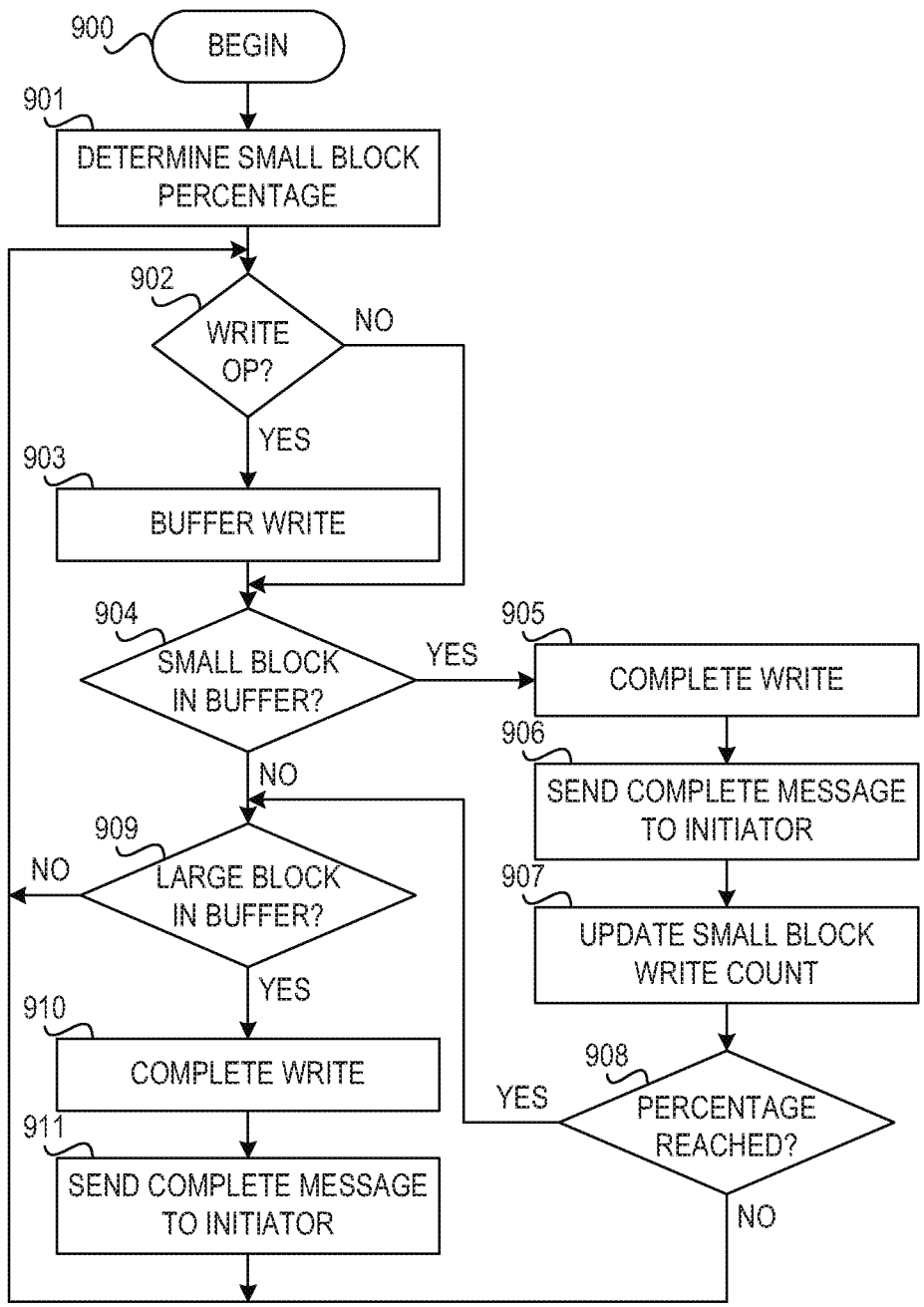
FIG. 9 is a flowchart illustrating operation of a mechanism in a solid-skate drive for balancing bandwidth between large block writes and small block writes in accordance with an illustrative embodiment.

FIG. 9 is a flowchart illustrating operation of a mechanism in a solid-state drive for balancing bandwidth between large block writes and small block writes in accordance with an illustrative embodiment. Operation begins (block 900), and the mechanism determines a percentage of bandwidth to be used for small block writes (block 901). The mechanism then determines whether a write operation is received (block 902). If the mechanism receives a write operation from an initiator, the mechanism buffers the write (block 903).

Thereafter, or if a write is not received in block 902, the mechanism determines whether a small block write is in the write buffer (block 904). If there is a small block write in the write buffer, the mechanism completes the write by persisting the write to the solid-state memory (block 905). The mechanism then sends a complete message to the initiator (block 906) and updates a small block write count (block 907).

The mechanism then determines whether the bandwidth percentage for small block writes is reached (block 908). For example, consider small blocks are 4 KB, large blocks are 400 KB, and the small block percentage, X, is 10%. The mechanism completes eleven small block operations (44 KB) before completing one large block operation (400 KB). If X is 50%, the SSD completes one hundred small block operations (400 KB) per large block operation (400 KB). If the bandwidth percentage for small block writes is not reached in block 908, operation returns to block 902 to determine whether a write operation is received from the initiator.

If the bandwidth percentage for small block writes is reached in block 908, or if there is no small block write in the write buffer in block 904, the mechanism determines whether a large block write is in the write buffer (block 909). If there is not a large block write in the write buffer, operation returns to block 902 to determine whether a write operation is received. If there is a large block write in the write buffer in block 909, the mechanism completes the write (block 910) and sends a complete message to the initiator (block 911). Thereafter, operation returns to block 902 to determine whether a write operation is received from the initiator.

The bandwidth is balanced by completing a predetermined number of small block writes before completing a large block write. The mechanism assumes or requires the queue depth of large and small block operations be controlled by the initiator. The initiator will not send another large block operation until a previous large block operation has completed. The initiator may also send a small block write operation only when a previous small block write operation has completed. Thus, if the SSD completes only small block operations until X % of the bandwidth is consumed. The initiator wilt then only send additional small block write operations. Once X % of the bandwidth is consumed, the SSD completes large block operations so the initiator can send more large block write operations.

Figure 10:
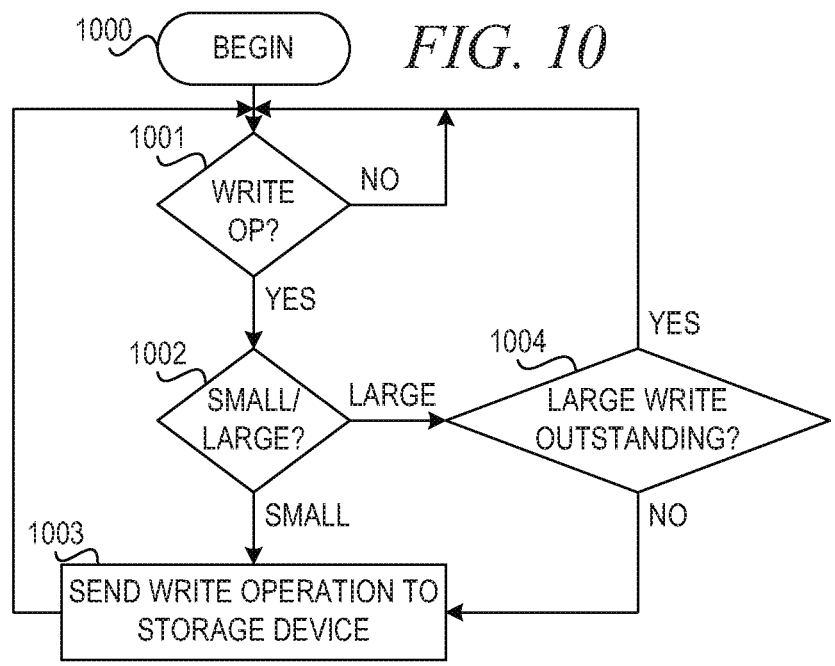
FIG. 10 is a flowchart illustrating operation of mechanism in an initiator for balancing bandwidth between large block writes and small block writes in accordance with an illustrative embodiment.

FIG. 10 is a flowchart illustrating operation of mechanism in an initiator for balancing bandwidth between large block writes and small block writes in accordance with an illustrative embodiment. Operation begins (block 1000), and the mechanism determines whether a write operation is queued to be sent to the storage device (block 1001). If a write operation is not to be sent to the storage device, operation returns to block 1001 to repeat until a write operation is queued to be sent to the storage device.

If a write operation is to be sent to the storage device in block 1001, the mechanism determines whether the write operation is a small block write or a large block write (block 1002). If the write operation is a small block write, the mechanism sends the write operation to the storage device (block 1003), and operation returns to block 1001. If the write operation is a largo block write, the mechanism determines whether a large block write is outstanding (block 1004). If a large block write is outstanding, the mechanism waits for the large block write to be completed, and operation returns to block 1001. If a large block write is not outstanding in block 1004, the mechanism sends the write operation to the storage device (block 1003), and operation returns to block 1001.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms to allow both large block and small block writes optimal bandwidth and to automatically adjust depending on changes in the workload. Write buffers or caches in the storage device are broken into categories. Some of the buffers are dedicated to large block writes and some to small block writes. Some buffers may serve both small and large block writes. The mechanisms may adjust the sizes of these buffers depending on changes in the workload, responsive determining that small block or large block response time increases. The mechanisms may convert dedicated small or large block buffers to shared buffers responsive to write counts of a given category falling below a predetermined threshold. The mechanism may dedicated a bandwidth percentage to small block writes to ensure small block writes are not starved.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a processor of a storage device, causes the processor to:
   configure a write buffer memory with a plurality of write buffer portions, wherein each write buffer portion is dedicated to a predetermined block size category within a plurality of block size categories;
   for each write operation from an initiator, determine a block size category of the write operation;
   perform each write operation by writing to a write buffer portion within the plurality of write buffer portions corresponding to the block size category of the write operation;
   determine a bandwidth percentage for a first block size category;
   complete writes of only the first block size category until the bandwidth percentage is reached; and
   complete a write of the second block size category responsive to the bandwidth percentage being reached.

2. The computer program product of claim 1, wherein the computer readable program further causes the processor to:
   responsive to a write buffer portion corresponding to a block size category of a given write operation being full, update a blocking delay value for the block size category of the given write operation.

3. The computer program product of claim 2, wherein the computer readable program further causes the processor to:
   adjust sizes of the plurality of write buffer portions based on blocking delay values of the block size categories.

4. The computer program product of claim 1, wherein configuring the write buffer memory comprises configuring a shared buffer portion, wherein the shared buffer portion stores writes of all block size categories, wherein the computer readable program further causes the processor to:
   responsive to a write buffer portion corresponding to a block size category of a given write operation being full, perform the given write operation by writing to the shared buffer portion.

5. The computer program product of claim 4, wherein the computer readable program further causes the processor to:
   responsive to the shared buffer portion being full, update a blocking delay value for the block size category of the given write operation.

6. The computer program product of claim 4, wherein the computer readable program further causes the processor to:
   for each write operation from the initiator, increment a counter corresponding to the block size category of the write operation;
   responsive to expiration of a time interval, determine whether a given counter corresponding to a given block size category is less than a predetermined threshold; and
   responsive to the given counter being less than the predetermined threshold, convert the write buffer portion corresponding to the given block size category to a shared buffer portion.

7. The computer program product of claim 6, wherein the computer readable program further causes the processor to:
   restart the time interval;
   for each write operation from the initiator, increment a counter corresponding to the block size category of the write operation;
   responsive to expiration of the time interval, determine whether the given counter is greater than the predetermined threshold; and
   responsive to the given counter being greater than the predetermined threshold, reconfigure the write buffer portion corresponding to the given block size.

8. The computer program product of claim 1, wherein the computer readable program is stored in a computer readable storage medium in a data processing system and wherein the computer readable program was downloaded over a network from a remote data processing system.

9. The computer program product of claim 1, wherein the computer readable program is stored in a computer readable storage medium in a server data processing system and wherein the computer readable program is downloaded over a network to a remote data processing system for use in a computer readable storage medium with the remote system.

10. A method, in a storage device, for performing a write operation, the method comprising:
configuring a write buffer memory with a plurality of write buffer portions, wherein each write buffer portion is dedicated to a predetermined block size category within a plurality of block size categories;
for each write operation from an initiator, determining a block size category of the write operation;
performing each write operation by writing to a write buffer portion within the plurality of write buffer portions corresponding to the block size category of the write operation;
determining a bandwidth percentage for a first block size category;
completing writes of only the first block size category until the bandwidth percentage is reached; and
completing a write of the second block size category responsive to the bandwidth percentage being reached.

11. The method of claim 10, further comprising:
responsive to a write buffer portion corresponding to a block size category of a given write operation being full, updating a blocking delay value for the block size category of the given write operation.

12. The method of claim 11, further comprising:
adjusting sizes of the plurality of write buffer portions based on blocking delay values of the block size categories.

13. The method of claim 10, wherein configuring the write buffer memory comprises configuring a shared buffer portion, wherein the shared buffer portion stores writes of all block size categories, the method further comprising:
responsive to a write buffer portion corresponding to a block size category of a given write operation being full, performing the given write operation by writing to the shared buffer portion.

14. The method of claim 13, further comprising:
responsive to the shared buffer portion being full, updating a blocking delay value for the block size category of the given write operation.

15. The method of claim 13, further comprising:
for each write operation from the initiator, incrementing a counter corresponding to the block size category of the write operation;
responsive to expiration of a time interval, determining whether a given counter corresponding to a given block size category is less than a predetermined threshold; and
responsive to the given counter being less than the predetermined threshold, converting the write buffer portion corresponding to the given block size category to a shared buffer portion.

16. The method of claim 15, further comprising:
restarting the time interval;
for each write operation from the initiator, incrementing a counter corresponding to the block size category of the write operation;
responsive to expiration of the time interval, determining whether the given counter is greater than the predetermined threshold; and
responsive to the given counter being greater than the predetermined threshold, reconfiguring the write buffer portion corresponding to the given block size.

17. An apparatus, comprising:
a processor; and
a memory coupled to the processor, wherein the memory comprises instructions which, when executed by the processor, cause the processor to:
configure a write buffer memory with a plurality of write buffer portions, wherein each write buffer portion is dedicated to a predetermined block size category within a plurality of block size categories;
for each write operation from an initiator, determine a block size category of the write operation;
perform each write operation by writing to a write buffer portion within the plurality of write buffer portions corresponding to the block size category of the write operation;
determine a bandwidth percentage for a first block size category;
complete writes of only the first block size category until the bandwidth percentage is reached; and
complete a write of the second block size category responsive to the bandwidth percentage being reached.

18. The apparatus of claim 17, wherein the instructions further cause the processor to:
responsive to a write buffer portion corresponding to a block size category of a given write operation being full, update a blocking delay value for the block size category of the given write operation; and
adjust sizes of the plurality of write of buffer portions based on blocking delay values of the block size categories.

19. The apparatus of claim 17, wherein configuring the write buffer memory comprises configuring a shared buffer portion, wherein the shared buffer portion stores writes of all block size categories, wherein the instructions further cause the processor to:
responsive to a write buffer portion corresponding to a block size category of a given write operation being full, perform the given write operation by writing to the shared buffer portion.

20. The apparatus of claim 19, wherein the instructions further cause the processor to:
responsive to the shared buffer portion being full, update a blocking delay value for the block size category of the given write operation.

21. The apparatus of claim 19, wherein the instructions further cause the processor to:
for each write operation from the initiator, incrementing a counter corresponding to block size category of the write operation;
responsive to expiration of a time interval, determining whether a given counter corresponding to a given block size category is less than a predetermined threshold; and responsive to the given counter being less than the predetermined threshold, converting the write buffer portion corresponding to the given block size category to a shared buffer portion.

22. The apparatus of claim 21, wherein the instructions further cause the processor to:
restart the time interval;
for each write operation from the initiator, increment a counter corresponding to the block size category of the write operation;
responsive to expiration of the time interval, determine whether the given counter is greater than the predetermined threshold; and
responsive to the given counter being greater than the predetermined threshold, reconfigure the write buffer portion corresponding to the given block size.

* * * * *